(12) United States Patent
Mao

(10) Patent No.: US 11,402,022 B2
(45) Date of Patent: Aug. 2, 2022

(54) MECHANICAL SEAL HAVING AUXILIARY LUBRICATING DEVICE

(71) Applicant: Beijing GeRuiFu M.S.T. Co., Ltd, Beijing (CN)

(72) Inventor: Wei Mao, Beijing (CN)

(73) Assignee: Bejing GeRuiFu M.S.T. Co., Ltd, Beijing (CN)

( * ) Notice: Subject to any disclaimer, the term of this patent is extended or adjusted under 35 U.S.C. 154(b) by 128 days.

(21) Appl. No.: 16/765,163

(22) PCT Filed: Oct. 24, 2018

(86) PCT No.: PCT/CN2018/111677
§ 371 (c)(1),
(2) Date: May 18, 2020

(87) PCT Pub. No.: WO2019/095950
PCT Pub. Date: May 23, 2019

(65) Prior Publication Data
US 2020/0347937 A1 Nov. 5, 2020

(30) Foreign Application Priority Data

Nov. 19, 2017 (CN) .......................... 201711151705.3

(51) Int. Cl.
*F16J 15/34* (2006.01)
(52) U.S. Cl.
CPC ................................. *F16J 15/3404* (2013.01)

(58) Field of Classification Search
CPC ............................... F16J 15/34; F16J 15/3404
See application file for complete search history.

(56) References Cited

U.S. PATENT DOCUMENTS 3,746,350 A * 7/1973 Mayer .................. F16J 15/3404
277/399
3,937,477 A * 2/1976 Gyory .................... F16J 15/008
277/426

FOREIGN PATENT DOCUMENTS

| CN | 104061328 A | 9/2014 |
|----|-------------|--------|
| CN | 206555446 U | 10/2017 |
| CN | 107654655 A | 2/2018 |
| CN | 207500480 U | 6/2018 |
| DE | 20302182 U1 | 6/2003 |
| JP | H11315935 A | 11/1999 |

* cited by examiner

*Primary Examiner* — Gilbert Y Lee

(57) ABSTRACT

A mechanical seal having an auxiliary cooling and lubricating device, comprising a sliding pairs, a mating ring, a sliding ring, a mating ring driving sleeve, a sliding ring retainer, a cartridge, a wave spring, a retainer, a bellow and a rubber cup; the mating ring driving sleeve is fixed on a shaft and the shaft drives the mating ring driving sleeve to rotate; the mating ring driving sleeve is provided thereon with multiple blades, the blades spinning a cooling medium around the mechanical seal toward the contact area of a sliding pair while the mating ring driving sleeve drives the mating ring to rotate so as to guarantee that the sliding pair is constantly in a lubricating and cooling state.

7 Claims, 5 Drawing Sheets

MECHANICAL SEAL HAVING AUXILIARY LUBRICATING DEVICE

TECHNICAL FIELD

The invention relates to a mechanical seal for the pump, specifically relating to a mechanical seal having an auxiliary lubricating device for the auto water pump.

BACKGROUND OF THE INVENTION

At present, auto water pump generally adopts mechanical face seal, known as water pump seal comprising a sliding pair, a mating ring driving sleeve, a sliding ring retainer, a cartridge, a wave spring (or a spiral spring), and a plurality of rubber auxiliary components. Materials for the sliding pairs usually adopt two combinations: carbon/silicon carbide (or using alumina ceramics to substitute for silicon carbide) and silicon carbide/silicon carbide (known as "double carbide water pump seal"). The combination of carbon/silicon carbide sliding pair possesses better self-lubrication property, but it exists drawbacks of poor foreign-material resistance ability, poor wear-resisting property, a sealing surface that is easy to damage and low service life; the combination of the silicon carbide/silicon carbide sliding pair has outstanding foreign-material resistance ability, lacks sensitivity to cooling liquid (good tolerance) and long service life, but it's weak in resistance to dry friction and are prone to cause noise.

The water pump impeller rotates around the impeller blade at a high speed to form a high-pressure area and pumps out the cooling liquid. The centrifugal action of the cooling liquid enables the cooling liquid in the vortex area behind the impeller (a mechanical seal is just arranged at the position) to be partially pumped away and forms certain negative pressure, causing the loss of cooling liquid around the mechanical seal, the mechanical seal free from the cooling liquid to generate dry running or noise, and the sealing surface damaged; further, the thermal overload causes decomposition (melted) of the auxiliary rubber components, then causes the mechanical seal (water pump seal) leakage failure, and meanwhile, the generated noise seriously influences the comfort of personnel.

Based on such market demand, the invention develops a mechanical seal with auxiliary lubricating function. The invention can greatly improve lubricating condition around the water pump seal, keep the water pump seal in good lubricating condition all the time, thereby eliminating all kinds of failure caused by dry running at the time of eliminating the origin of noise and solving the problem of noise.

SUMMARY OF THE INVENTION

The invention aims to provide a mechanical seal which can greatly improve lubricating condition around the water seal, keep the water pump seal in good lubricating condition all the time, and at the same time, cooling the sliding pair and further eliminate leakage caused by dry running at the time of eliminating the origin of noise and solving the problem of noise.

The invention adopts following technical plan: a mechanical seal having an auxiliary lubricating device, comprising a sliding pair, a mating ring driving sleeve, a sliding ring retainer, a cartridge, a wave spring (or a spiral spring), a retainer, a bellow and a rubber cup wherein the mating ring driving sleeve is fixed on a bearing shaft or on a motor shaft and the shaft drives the mating ring driving sleeve to rotate; the mating ring driving sleeve is provided thereon with multiple blades, the blades spinning the cooling medium around the mechanical seal toward the contact area of the sliding pair while the mating ring driving sleeve driving the mating ring to rotate so as to guarantee that the sliding pair is constantly in a lubricating and cooling state, solving the problem of seal failure caused by the decomposition of the auxiliary sealing rubber components due to dry running of the mechanical seal sliding pair; meanwhile, the mating ring driving sleeve is provided by means of a variable diameter design with drive claws and blade water inlets, the drive claws is matched with the mating ring in the sliding pair to drive the mating ring to rotate, the mating ring part corresponding to the blade water inlet is completely exposed outside, and the blades directly spray the cooling medium onto the contact area of the mating ring and the sliding pair so that the problem of noise generated by mechanical seal cooling and dry friction is solved.

The invention has following advantages:

1. The mating ring driving sleeve of the mechanical seal is provided thereon with cooling blades to make sure there are sufficient lubrication and cooling medium on the sliding pair of the mechanical seal so that the sliding pair can get sufficient cooling and lubrication, greatly improving the service life of the mechanical seal and reducing noise.

2. The variable diameter treatment of the mating ring driving sleeve not only guarantees enough driving force to drive the mating ring, but also exposing the mating ring in the cooling liquid so as to help rapidly reduce the temperature risen by friction of the mating ring, extending life of the mating ring auxiliary rubber sealing components, and lower fees for component maintenance.

3. Setting grooves on the variable-diameter steps enables cooling medium around the water pump seal surrounded by the driving blades can circulate with peripheral medium then the sliding pair can directly and fully circulates with the peripheral cooling media, so as to cool and lubricate the friction pair and prolong the service life.

The invention is further described in detail hereinafter with reference to the drawings.

DETAILED DESCRIPTION OF THE PREFERRED EMBODIMENTS

Figure 1:
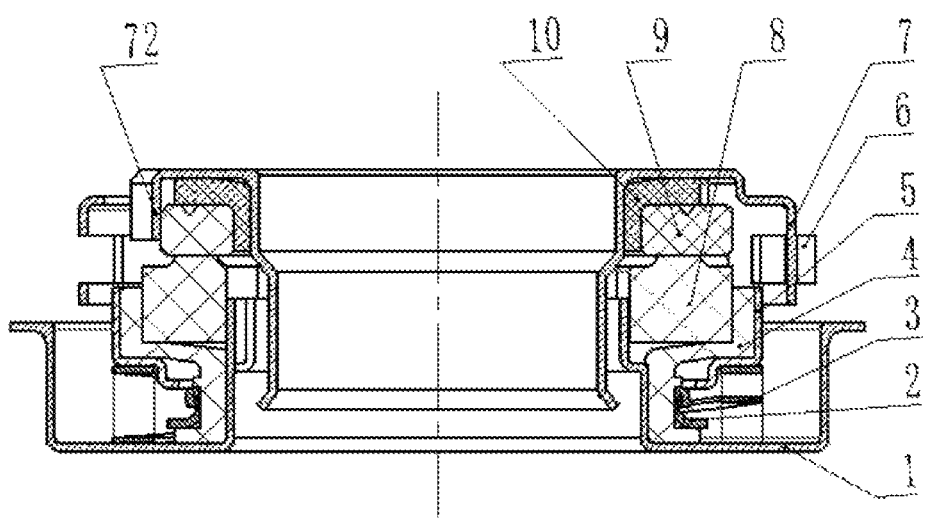
FIG. 1 is the principal sectional view of the invention.

As shown in FIG. 1, the invention discloses a mechanical seal having an auxiliary lubricating device comprising a sliding pair, namely a mating ring 9 and a sliding ring 8, a mating ring driving sleeve 7, a sliding ring retainer 5, a cartridge 1, a wave spring (or a spiral spring) 3, a retainer 2, a bellow 4 and a rubber cup 10; the mating ring driving sleeve 7 is provided thereon with blades 6 and the mating ring driving sleeve 7 rotates at a high speed; the mating ring driving sleeve is provided by means of a variable diameter design with drive claws 72 which drives the mating ring 9 to rotate synchronously; the mating ring 9 and the sliding ring 8 ensure that the sliding pair surface be sealed via the wave spring 3, the outer surface of the sliding ring 8 is connected with the sliding ring retainer 5 via the bellow 4 wherein the bellow plays the role of sealing; the inner surface of the sliding ring 8 is connected and fixed with the cartridge 1 via positioning boss, the blades 6 directly spraying cooling medium onto the contact area of the mating ring and the sliding pair, exerting effects of cooling and lubricating the sliding pair, and at the same time, solving the noise problem caused by insufficient lubrication.

Figure 2:
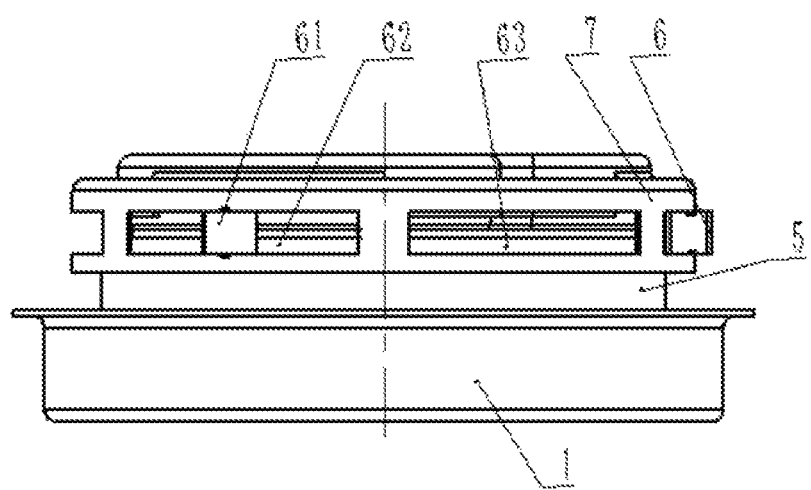
FIG. 2 is the right view of the invention.

FIG. 2 is the right view of the invention wherein the blades 6 are provided with one or a plurality of circulating water grooves 63 and one or a plurality of blade water grooves 62 along the excircle of the larger end of the variable diameter of the mating ring driving sleeve 7; the mating ring driving sleeve 7 rotates at a high speed and sprays the cooling medium outside thereof onto the sliding pair via blades.

Figure 3:
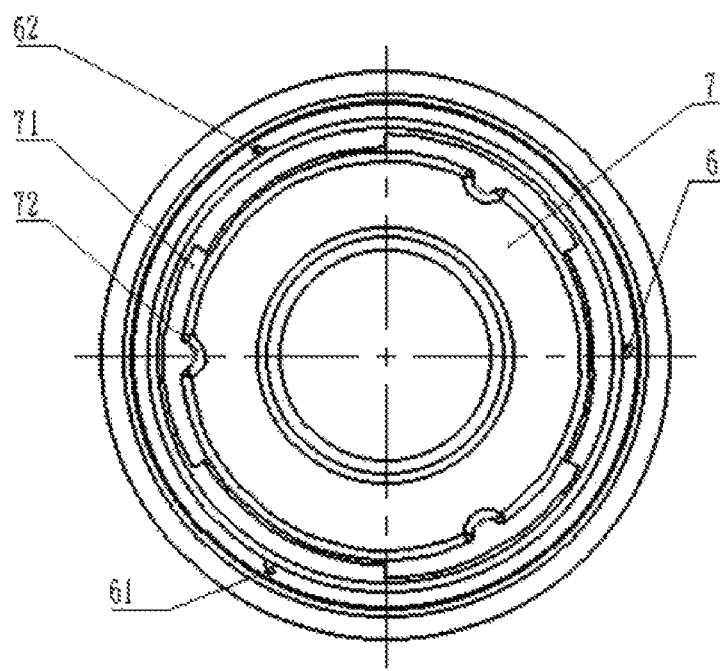
FIG. 3 is the top view of the invention.

FIG. 3 is the top view of the invention wherein the mating ring driving sleeve 7 is provided with a plurality of grooves 71 the material of which unfolds and wraps the mating ring, and at the same time, one or a plurality of semi-circular arc bosses are squeezed to form on the mating ring driving sleeve 7 and is matched with the mating ring to drive the mating ring to rotate at a high speed; as the drive claws coats the mating ring, the cooling medium of blades 6 are spun directly on the mating ring, playing the role of directly cooling and lubricating the friction surface of the mating ring.

Figure 4:
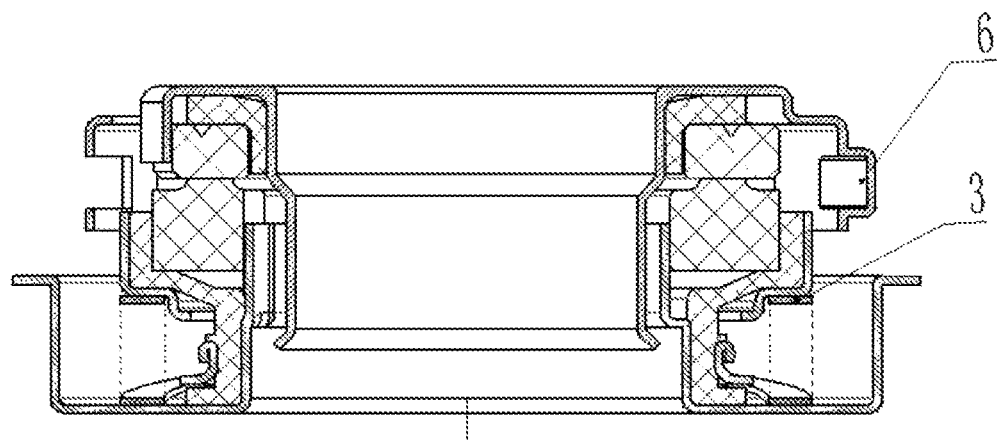
FIG. 4 is the principal sectional view of another kind of blade structure in the invention.

FIG. 4 is the principal sectional view of another kind of blade structure in the invention wherein the outer circle of the mating ring driving sleeve is provided with a wedge-shaped impeller 6 which directly spins the cooling medium to the contact area of the mating ring and the sliding ring sliding pair, playing the role of cooling and lubricating the sliding pair.

Figure 5:
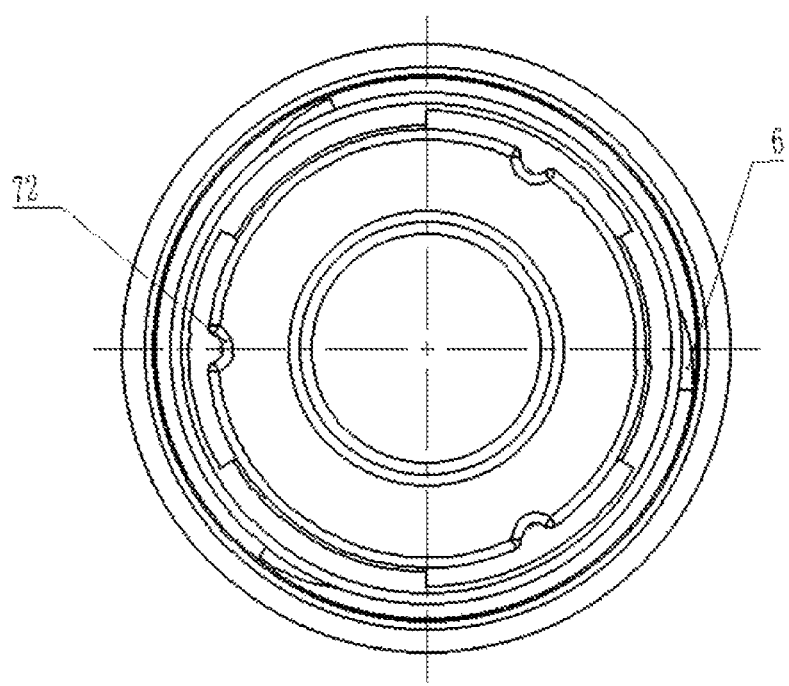
FIG. 5 is the top view of another kind of blade structure in the invention.

FIG. 5 is the top view of another kind of blade structure in the invention wherein the front end of the wedge-shaped impeller 6 is opened, and the cooling medium is sucked into the friction surface to realize the cooling and lubricating effects.

What is claimed is:

1. A mechanical seal having an auxiliary cooling and lubricating device comprising a sliding pair, a mating ring driving sleeve, a sliding ring retainer, a cartridge, a wave spring, a retainer, a bellow and a rubber cup wherein the mating ring driving sleeve is fixed on a shaft of the bearing and the shaft drives the mating ring driving sleeve to rotate; the mating ring driving sleeve is provided thereon with multiple blades, the blades spinning a cooling medium around the mechanical seal toward the contact area of a sliding pair while the mating ring driving sleeve driving the mating ring to rotate so as to guarantee that the sliding pair is constantly in a lubricating and cooling state; meanwhile, the mating ring driving sleeve is provided by means of a variable diameter design with transitions steps, and multiple windows are provided at end faces of the steps, the variable diameter of the mating ring driving sleeve satisfies a function of driving the mating ring, while also directly exposing the mating ring in a cooling liquid so as to help cool the mating ring; the windows at the end faces of the steps are first used for forming driving claws while helping to circulate a cooling liquid that is surrounded by the blades and that is located around the mechanical seal as well as the cooling liquid at the periphery such that temperature remains stable around the mechanical seal.

2. The mechanical seal having an auxiliary cooling and lubricating device of claim 1 wherein the blades on the mating ring driving sleeve and the blades are distributed in large excircle after the blades changed its diameter along the mating ring driving sleeve, and the axial center position of blades corresponds to the middle positions of the joint surfaces of the sliding pair.

3. The mechanical seal having an auxiliary cooling and lubricating device of claim 1 wherein the shape of the blades on the mating ring driving sleeve is linear, spiral, arc or crescent; the blades are formed by cutting and stretching along the two ends of the blades along the axial direction, or formed by directly stretching the two ends of the blades along the axial direction without cutting, or formed by welding, and formed along the excircle of the driving sleeve.

4. The mechanical seal having an auxiliary cooling and lubricating device of claim 1 wherein the direction of the cooling medium sprayed by the blades acts on the sliding pair, and the positions of the blades correspond to the joint surfaces of the sliding pair.

5. The mechanical seal having an auxiliary cooling and lubricating device of claim 1 wherein two or more semi-circular arc driving claws are designed on a variable-diameter boss of the mating ring driving sleeve and are used for fixing and driving the mating ring of the sliding pair wherein the driving claws may be straight as well as curved in shape.

6. The mechanical seal having an auxiliary cooling and lubricating device of claim 1 wherein at the position of the mating ring driving sleeve along the external diameter of the mating ring is provided by the means of variable diameter treatment with steps, and multiple windows are provided at end faces of the steps; on the contact area of the sliding pair, the cooling medium circulates with peripheral medium; the steps are in the form of straight steps perpendicular to the axial direction, or inclined steps of any angle.

7. The mechanical seal having an auxiliary cooling and lubricating device of claim 1 wherein one or more water inlets are arranged on the mating ring driving sleeve.

* * * * *